United States Patent
Matsuo

(10) Patent No.: US 9,454,062 B2
(45) Date of Patent: Sep. 27, 2016

(54) OBSERVATION OPTICAL SYSTEM, VIEWFINDER EQUIPPED WITH OBSERVATION OPTICAL SYSTEM AND METHOD FOR MANUFACTURING OBSERVATION OPTICAL SYSTEM

(75) Inventor: Taku Matsuo, Kawasaki (JP)

(73) Assignee: Nikon Corporation, Tokyo (JP)

( * ) Notice: Subject to any disclaimer, the term of this patent is extended or adjusted under 35 U.S.C. 154(b) by 533 days.

(21) Appl. No.: 13/237,905

(22) Filed: Sep. 20, 2011

(65) Prior Publication Data

US 2012/0127595 A1    May 24, 2012

(30) Foreign Application Priority Data

Sep. 21, 2010  (JP) ................................. 2010-210763

(51) Int. Cl.
| | |
|---|---|
| G02B 3/02 | (2006.01) |
| G02B 9/14 | (2006.01) |
| G03B 13/00 | (2006.01) |
| G02B 9/16 | (2006.01) |
| G02B 13/00 | (2006.01) |

(52) U.S. Cl.
CPC ................ *G03B 13/00* (2013.01); *G02B 9/16* (2013.01); *G02B 13/0035* (2013.01); *Y10T 29/49826* (2015.01)

(58) Field of Classification Search
USPC ................ 359/785, 716, 784, 789, 790, 900
See application file for complete search history.

(56) References Cited

U.S. PATENT DOCUMENTS

| | | |
|---|---|---|
| 5,546,224 A | 8/1996 | Yokota |
| 6,785,054 B1 | 8/2004 | Cahall |
| 6,847,494 B2 | 1/2005 | Cahall |
| 7,301,712 B2 * | 11/2007 | Kamo ........................... 359/785 |
| 7,492,533 B2 * | 2/2009 | Miyazaki et al. ............. 359/785 |
| 7,969,658 B2 | 6/2011 | Nishio et al. |
| 7,978,417 B2 | 7/2011 | Nishio et al. |
| 2004/0165278 A1 | 8/2004 | Cahall |
| 2004/0165283 A1 | 8/2004 | Cahall |
| 2010/0290129 A1 | 11/2010 | Nishio et al. |
| 2011/0122502 A1 | 5/2011 | Nishio et al. |

FOREIGN PATENT DOCUMENTS

| | | |
|---|---|---|
| JP | 05-040232 A | 2/1993 |
| JP | 06-258582 A | 9/1994 |
| JP | 07-152068 A | 6/1995 |
| JP | 2001-324741 A | 11/2001 |
| JP | 2002-048985 A | 2/2002 |
| JP | 2004-258653 A | 9/2004 |
| JP | 2006-106491 A | 4/2006 |
| JP | 2007-121340 A | 5/2007 |

(Continued)

*Primary Examiner* — Jack Dinh
(74) *Attorney, Agent, or Firm* — Shapiro, Gabor and Rosenberger, PLLC

(57) ABSTRACT

An observation optical system for observing an object includes, in order from the object side: a first lens having positive refractive power; a second lens having negative refractive power and a concave surface facing the object side; and a third lens having positive refractive power and a convex surface facing an eyepoint side. An aspherical surface is included on at least one lens surface, and given conditional expressions are satisfied, thereby providing a compact observation optical system having excellent optical performance, a viewfinder equipped with the observation optical system, and a method for manufacturing the observation optical system.

24 Claims, 12 Drawing Sheets

(56) References Cited

FOREIGN PATENT DOCUMENTS

| JP | 2008-096552 A | 4/2008 |
|----|---------------|--------|
| JP | 2008-203290 A | 9/2008 |
| JP | 2010-175795 A | 8/2010 |
| JP | 2010-266776 A | 11/2010 |

* cited by examiner

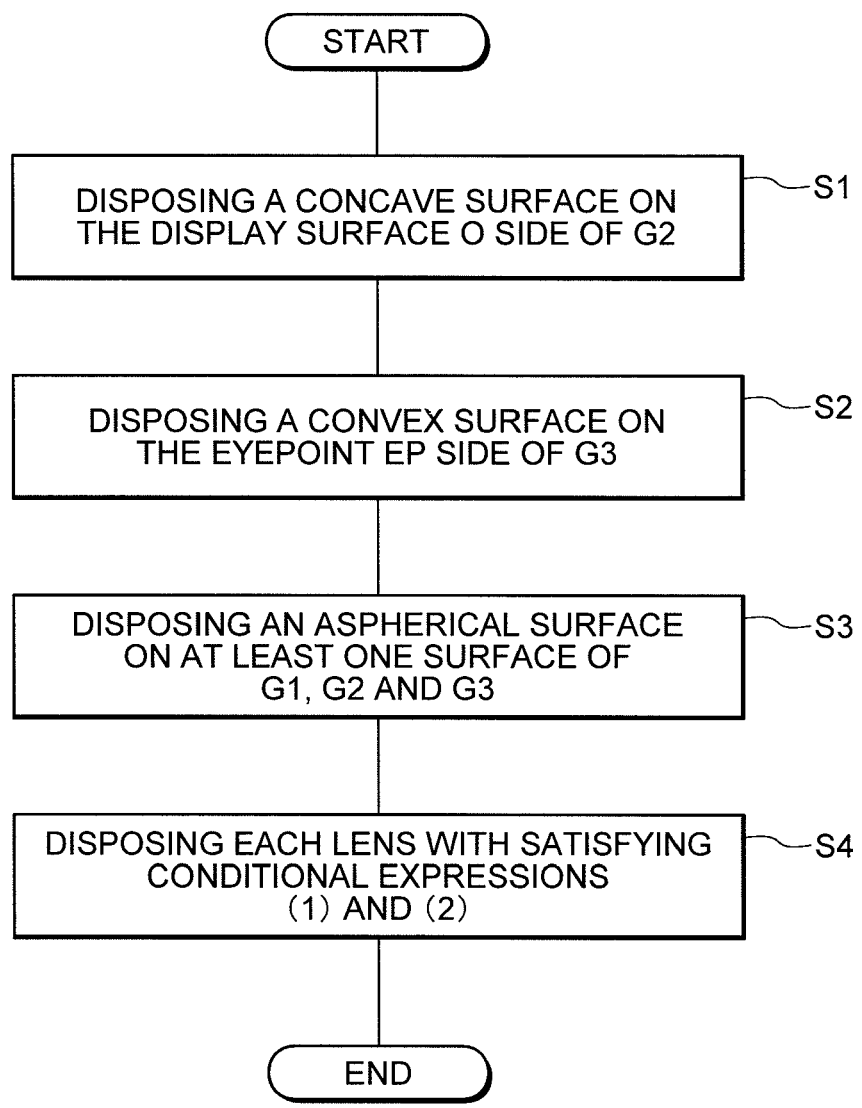

OBSERVATION OPTICAL SYSTEM, VIEWFINDER EQUIPPED WITH OBSERVATION OPTICAL SYSTEM AND METHOD FOR MANUFACTURING OBSERVATION OPTICAL SYSTEM

The disclosure of the following priority application is herein incorporated by reference:

Japanese Patent Application No. 2010-210763 filed on Sep. 21, 2010.

BACKGROUND OF THE INVENTION

1. Field of the Invention

The present invention relates to an observation optical system for observing a compact display panel, a viewfinder equipped with the observation optical system, and a method for manufacturing the observation optical system.

2. Related Background Art

A viewfinder capable of observing a compact display panel with a high magnification has been proposed (see, for example, Japanese Patent Application Laid-Open No. 2002-048985).

However, the conventional observation optical system installed in the conventional viewfinder has had a problem that correction of aberrations is not sufficient.

SUMMARY OF THE INVENTION

The present invention is made in view of the above-described problem, and has an object to provide a compact observation optical system having excellent optical performance, a viewfinder equipped with the observation optical system, and a method for manufacturing the observation optical system.

In order to accomplish the above-described object, according to a first aspect of the present invention, there is provided an observation optical system for observing an object comprising, in order from the object side: a first lens having positive refractive power; a second lens having negative refractive power and a concave surface facing the object side; and a third lens having positive refractive power and a convex surface facing an eyepoint side, an aspherical surface being included on at least one lens surface, and the following conditional expressions being satisfied:

$$0.80 < (R22+R21)/(R22-R21) < 2.00$$

$$1.30 < f1/(-f2) < 2.00$$

where R21 denotes a radius of curvature of the object side lens surface of the second lens, R22 denotes a radius of curvature of the eyepoint side lens surface of the second lens, f1 denotes a focal length of the first lens, and f2 denotes a focal length of the second lens.

According to a second aspect of the present invention, there is provided a viewfinder equipped with an image display panel and the observation optical system according to the first aspect.

According to a third aspect of the present invention, there is provided an optical apparatus equipped with the observation optical system according to the first aspect.

According to a fourth aspect of the present invention, there is provided a viewfinder comprising: an image display panel; and an observation optical system for observing an image displayed on the image display panel, the observation optical system consisting of, in order from the image display panel side, a first lens having positive refractive power, a second lens having negative refractive power and a concave surface facing the image display panel side, and a third lens having positive refractive power and a convex surface facing an eyepoint side, an aspherical surface being formed on either one of the first lens and the third lens, and the following conditional expression being satisfied:

$$0.20 < h/TL < 0.35$$

where h denotes an object height, and TL denotes a distance between the object plane and the most eyepoint side lens surface.

According to a fifth aspect of the present invention, there is provided an optical apparatus equipped with the view finder according to the fourth aspect.

According to a sixth aspect of the present invention, there is provided a method for manufacturing an observation optical system including, in order from an object side, a first lens having positive refractive power, a second lens having negative refractive power, and a third lens having positive refractive power, the method comprising steps of: disposing a concave surface on the object side lens surface of the second lens; disposing a convex surface on an eyepoint side lens surface of the third lens; disposing an aspherical surface on at least one of the first lens through the third lens; and disposing each lens with satisfying the following conditional expressions:

$$0.80 < (R22+R21)/(R22-R21) < 2.00$$

$$1.30 < f1/(-f2) < 2.00$$

where R21 denotes a radius of curvature of the object side lens surface of the second lens, R22 denotes a radius of curvature of the eyepoint side lens surface of the second lens, f1 denotes a focal length of the first lens, and f2 denotes a focal length of the second lens.

According to a seventh aspect of the present invention, there is provided a method for manufacturing a view finder including an image display panel and an observation optical system for observing an image displayed on the image display panel, the method comprising steps of: disposing, in order from the image display panel side, a first lens having positive refractive power, a second lens having negative refractive power and a concave surface facing the image display panel side, and a third lens having positive refractive power and a convex surface facing an eyepoint side, into the observation optical system; disposing an aspherical surface on either one of the first lens and the third lens; and disposing each lens with satisfying the following conditional expression:

$$0.20 < h/TL < 0.35$$

where h denotes an object height, and TL denotes a distance between the object plane and the most eyepoint side lens surface.

The present invention makes it possible to provide a compact observation optical system having excellent optical performance, a viewfinder equipped with the observation optical system, and a method for manufacturing the observation optical system.

BRIEF DESCRIPTION OF THE DRAWINGS

FIG. 12 is a flowchart showing an outline of a method for manufacturing an observation optical system according to the present application.

DESCRIPTION OF THE MOST PREFERRED EMBODIMENT

Figure 1:
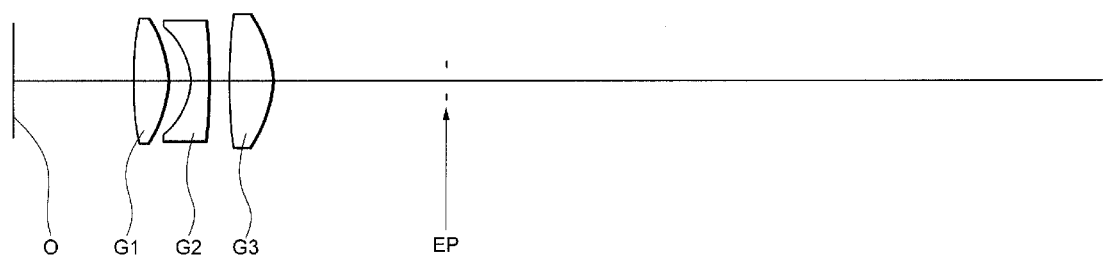
FIG. 1 is a sectional view showing a configuration of an observation optical system according to Example 1 of the present application.

An observation optical system, a viewfinder equipped with the observation optical system and a method for manufacturing the observation optical system according to the present application will be explained below.

At first, an observation optical system according to the present application is explained.

An observation optical system according to the present application is an observation optical system for observing an image display panel displaying an image. Here, the image display panel includes a liquid crystal panel, a screen and a focusing screen for displaying an image of an object to be photographed in an imaging apparatus such as a camera. The following explanation is made an observation optical system for observing a liquid crystal panel as an example.

An observation optical system according to the present application is an observation optical system for observing an object that is an image display panel and includes, in order from the object side, a first lens having positive refractive power, a second lens having negative refractive power and a concave surface facing the object side, and a third lens having positive refractive power and a convex surface facing an eyepoint side. At least one aspherical surface is included. The following conditional expressions are satisfied:

$$0.80 < (R22+R21)/(R22-R21) < 2.00 \quad (1)$$

$$1.10 < f1/(-f2) < 2.00 \quad (2)$$

where R21 denotes a radius of curvature of the object side lens surface of the second lens, R22 denotes a radius of curvature of the eyepoint side lens surface of the second lens, f1 denotes a focal length of the first lens, and f2 denotes a focal length of the second lens.

With disposing the first lens having positive refractive power to the object side, an observation optical system according to the present application makes it possible to realize both of securing an object-space telecentricity and making the observation optical system compact. Moreover, with disposing the second lens having negative refractive power and a concave surface facing the object side, it becomes possible to correct spherical aberration and distortion generated in the first lens. Furthermore, with disposing the third lens having positive refractive power and a convex surface facing the eyepoint side, it becomes possible to realize both of a high magnification and compactness and to correct coma and distortion.

Generally, when a high magnification observation optical system having an apparent angle of view of 20 degrees or more and a diagonal length of an object to be observed of about 15 mm is to be realized, mainly coma and distortion become difficult to be corrected. In particular, deterioration in coma on the peripheral angle of view is conspicuous, so that resolution on the periphery of the visual field declines. Moreover, in order to secure the magnification, strong positive power is required, so that positive distortion is generated and visual field is distorted to become a pincushion shape. As a result, an uncomfortable feeling is created in the observer. With this configuration of the observation optical system according to the present application, it becomes possible to excellently correct these aberrations.

Conditional expression (1) is for defining the shape of the second lens. With disposing strong concave surface to the object side of the second lens and satisfying conditional expression (1), it becomes possible to secure suitable magnification and eyepoint in spite of shortening the total length of the optical system, and to excellently correct coma and curvature of field. Here, strong concave surface means that the radius of curvature of the lens surface is small, in other words, curvature of the lens surface is large. Incidentally, when the lens surface is an aspherical surface, a paraxial radius of curvature is to be used as a radius of curvature.

When the ratio (R22+R21)/(R22−R21) is equal to or falls below the lower limit of conditional expression (1), the position of the principal point comes near to the object side, so that the whole of the optical system becomes large. Accordingly, it is undesirable. Moreover, when the total length of the optical system is to be maintained, the focal length becomes short, so that it becomes difficult to secure the eyepoint. Moreover, correction of distortion becomes insufficient, so that it is undesirable. In order to secure the effect of the present application, it is desirable to set the lower limit of conditional expression (1) to 1.00.

On the other hand, when the ratio (R22+R21)/(R22−R21) is equal to or exceeds the upper limit of conditional expression (1), a light ray corresponding to a large angle of view is incident on the lens surface with a large angle, so that coma and curvature of field are excessively generated. Accordingly, these aberrations become difficult to be corrected, so that it is undesirable. In order to secure the effect of the present application, it is desirable to set the upper limit of conditional expression (1) to 1.80.

Conditional expression (2) is for defining a ratio of the focal length of the first lens to that of the second lens. With satisfying conditional expression (2), it becomes possible to realize both of high magnification and an object-space telecentricity, and to excellently correct coma. In particular, when the observation optical system is for observing a liquid crystal panel, telecentricity has to be secured because of narrow field angle of view of the liquid crystal panel. Otherwise, the image of peripheral portion of the liquid crystal panel becomes extremely difficult to be observed because of color smear and insufficient light amount.

When the ratio f1/(−f2) is equal to or falls below the lower limit of conditional expression (2), refractive power of the second lens becomes weak in comparison with refractive power of the first lens, so that sufficient height of the light ray incident on the third lens cannot be obtained. Accordingly, magnification cannot be increased. As a result, visual field becomes small, and the image becomes difficult to be observed, so that it is undesirable. In order to increase magnification under the condition where the ratio f1/(−f2) is equal to or falls below the lower limit of conditional expression (2), the height of the ray incident on the first lens has to be increased with breaking telecentricity, so that it becomes impossible to realize both of high magnification and telecentricity. Moreover, distortion generated in the first lens becomes excessively large to become difficult to be corrected in the second lens, so that it is undesirable. In order to secure the effect of the present application, it is desirable to set the lower limit of conditional expression (2) to 1.30.

On the other hand, when the ratio f1/(−f2) is equal to or exceeds the upper limit of conditional expression (2), refractive power of the second lens becomes strong. As a result, the height of the ray incident on the first lens from the object side inevitably becomes low, so that telecentricity cannot be secured. Moreover, correction of distortion becomes insufficient, so that it is undesirable. In order to secure the effect of the present application, it is desirable to set the upper limit of conditional expression (2) to 1.90.

In an observation optical system according to the present application, the following conditional expression (3) is preferably satisfied:

$$0.50 < (-1) \times ((R32+R31)/(R32-R31)) < 1.00 \qquad (3)$$

where R31 denotes a radius of curvature of the object side lens surface of the third lens, and R32 denotes a radius of curvature of the eyepoint side lens surface of the third lens.

Conditional expression (3) is for defining the shape of the third lens. With disposing strong convex surface to the eyepoint side of the third lens and satisfying conditional expression (3), it becomes possible to secure a proper magnification and eyepoint in spite of shortening the total length of the optical system. Moreover, coma and curvature of field can be excellently corrected. Incidentally, the strong convex surface means that the radius of curvature of the lens surface is small, in other words, curvature of the lens surface is large.

When the value $(-1) \times ((R32+R31)/(R32-R31))$ is equal to or falls below the lower limit of conditional expression (3), the position of the principal point comes close to the object side, so that the whole of the optical system becomes large. Accordingly, it is undesirable. When the total length of the optical system is forced to be maintained, the focal length becomes short, so that the eyepoint becomes difficult to be secured. Moreover, correction of distortion becomes insufficient, so that it is undesirable. In order to secure the effect of the present application, it is preferable to set the lower limit of conditional expression (3) to 0.60.

On the other hand, when the value $(-1) \times ((R32+R31)/(R32-R31))$ is equal to or exceeds the upper limit of conditional expression (3), a light ray corresponding to a large angle of view is incident on the lens surface with a large angle, so that coma and curvature of field are excessively generated. Accordingly, these aberrations become difficult to be corrected, so that it is undesirable. In order to secure the effect of the present application, it is desirable to set the upper limit of conditional expression (3) to 0.90. Furthermore, it is most preferable that conditional expressions (1) and (3) are satisfied at the same time.

In an observation optical system according to the present application, the following conditional expression (4) is preferably satisfied:

$$0.05 < d12/TL < 0.30 \qquad (4)$$

where d12 denotes a distance between the eyepoint side lens surface of the first lens and the object side lens surface of the second lens, and TL denotes a distance between the object plane and the most eyepoint side lens surface.

Conditional expression (4) is for defining the distance between the first lens group and the second lens group. With satisfying conditional expression (4), it becomes possible to excellently correct coma. Coma excessively generated in the first lens can be corrected by the negative refractive surface of the second lens by means of providing a suitable distance between the first lens and the second lens. Accordingly, it becomes possible to excellently correct coma with increasing magnification. Incidentally, TL is to be an air converted total length when a plane parallel plate is inserted.

When the ratio d12/TL is equal to or falls below the lower limit of conditional expression (4), the distance between the first lens and the second lens becomes small, and correction of coma on the periphery becomes insufficient, so that it is undesirable. In order to secure the effect of the present application, it is preferable to set the lower limit of conditional expression (4) to 0.08.

On the other hand, when the ratio d12/TL is equal to or exceeds the upper limit of conditional expression (4), the distance between the first lens and the second lens becomes large, and correction of coma on the periphery becomes excessive, so that it is undesirable. In order to secure the effect of the present application, it is preferable to set the upper limit of conditional expression (4) to 0.20.

In an observation optical system according to the present application, the following conditional expression (5) is preferably satisfied:

$$0.90 < f1/f3 < 2.30 \qquad (5)$$

where f3 denotes a focal length of the third lens.

Conditional expression (5) is for excellently correcting distortion and coma deteriorated upon increasing positive refractive power of the first lens and the third lens accompanied with increasing magnification of the optical system. With satisfying conditional expression (5), distortion largely generated in the first lens is corrected a little too much by the second lens, and the excessive amount can be corrected by distortion generated in the third lens.

When the ratio f1/f3 is equal to or falls below the lower limit of conditional expression (5), the correction amount of the second lens becomes insufficient, so that distortion further generated in the third lens becomes difficult to be corrected. As a result, positive distortion is remained, so that it is undesirable. Moreover, inclination of image plane is generated to positive diopter side by strong positive refractive power of the third lens, so that it is undesirable. In order to secure the effect of the present application, it is preferable to set the lower limit of conditional expression (5) to 1.00.

On the other hand, when the ratio f1/f3 is equal to or exceeds the upper limit of conditional expression (5), the correction amount of distortion by the second lens becomes excessive, and negative distortion is generated. As a result, visual field becomes distorted to a barrel shape, so that it is undesirable. Moreover, coma generated in the second lens becomes excessively large, so that it becomes difficult to correct coma by the third lens. Accordingly, it is undesirable.

In order to secure the effect of the present application, it is preferable to set the upper limit of conditional expression (5) to 1.70.

In an observation optical system according to the present application, all of the first lens, the second lens and the third lens are preferably made from plastic materials. With constructing all of lenses from plastic materials, it becomes possible to reduce manufacturing cost and to save weight. Moreover, plastic materials are easy to be processed, so that lenses having excellent optical performance can be manufactured.

In an observation optical system according to the present application, an aspherical surface is preferably formed on the object side lens surface of the second lens. With this configuration, coma, distortion and spherical aberration can be excellently corrected.

In an observation optical system according to the present application, an aspherical surface is preferably formed on the eyepoint side lens surface of the third lens. With this configuration, distortion, coma and spherical aberration can be excellently corrected.

In an observation optical system according to the present application, the following conditional expression (6) is preferably satisfied:

$$0.20 < h/TL < 0.35 \qquad (6)$$

where h denotes an object height, and TL denotes a distance between the object and the most eyepoint side lens surface.

Conditional expression (6) is for defining the total length of the optical system with respect to the object (image display panel) height. With satisfying conditional expression (6), observation can be carried out with a proper magnification.

When the ratio h/TL is equal to or falls below the lower limit of conditional expression (6), positive power of the optical system becomes small, as a result, the optical system becomes large, so that it is undesirable. Moreover, this brings extreme drop of magnification, so that observed image becomes small and difficult to be recognized. In order to secure the effect of the present application, it is preferable to set the lower limit of conditional expression (6) to 0.22.

On the other hand, when the ratio h/TL is equal to or exceeds the upper limit of conditional expression (6), since observation starts to be carried out up to the periphery of the image display panel, magnification tends to become large. On this occasion, power of the whole of the optical system becomes strong, and pincushion type distortion and coma are largely generated, so that such aberrations become difficult to be corrected. In order to secure the effect of the present application, it is preferable to set the upper limit of conditional expression (6) to 0.26.

In an observation optical system according to the present application, the following conditional expression (7) is preferably satisfied:

$$5.60 < h < 12.00 \qquad (7).$$

Conditional expression (7) defines the size of the object (image display panel) to be observed. With satisfying conditional expression (7), observation can be carried out with a proper magnification.

When the value h is equal to or falls below the lower limit of conditional expression (7), the object height becomes too small, so that it becomes difficult to maintain object-space telecentricity with securing observation magnification. Accordingly, it is undesirable. On the other hand, when the value h is equal to or exceeds the upper limit of conditional expression (7), in order to correct various aberrations with securing observation magnification, the optical system become large, so that it is undesirable.

Moreover, a viewfinder according to the present application is equipped with an image display panel, and the above-described observation optical system. With this configuration, it becomes possible to realize a compact viewfinder having excellent optical performance.

In a viewfinder according to the present application, a distance between the image display panel and the object side lens surface of the first lens is varied, thereby carrying out diopter adjustment.

In a viewfinder according to the present application, respective distances between the first through third lenses do not varied upon carrying out diopter adjustment.

Moreover, a viewfinder according to the present application includes an image display panel and an observation optical system for observing an image displayed on the image display panel. The observation optical system consists of, in order from the image display panel side, a first lens having positive refractive power, a second lens having negative refractive power and a concave surface facing the image display panel side, and a third lens having positive refractive power and a convex surface facing an eyepoint side. An aspherical surface is formed on either one of the first lens and the third lens. The following conditional expression (6) is satisfied:

$$0.20 < h/TL < 0.35 \qquad (6)$$

where h denotes an object height, and TL denotes a distance between the object plane and the most eyepoint side lens surface.

With this configuration, it becomes possible to realize a compact viewfinder having excellent optical performance.

As described above, conditional expression (6) is for defining the total length of the optical system with respect to the object (image display panel) height. With satisfying conditional expression (6), observation can be carried out with a proper magnification.

When the ratio h/TL is equal to or falls below the lower limit of conditional expression (6), positive power of the optical system becomes small, as a result, the optical system becomes large. Moreover, this causes extreme drop of magnification, so that observed image becomes small and difficult to be recognized. In order to secure the effect of the present application, it is preferable to set the lower limit of conditional expression (6) to 0.22.

On the other hand, when the ratio h/TL is equal to or exceeds the upper limit of conditional expression (6), since observation starts to be carried out up to the periphery of the image display panel, magnification tends to become large. On this occasion, power of the whole of the optical system becomes strong, and pincushion type distortion and coma are largely generated, so that such aberrations become difficult to be corrected. In order to secure the effect of the present application, it is preferable to set the upper limit of conditional expression (6) to 0.26.

In a viewfinder according to the present application, the following conditional expression (7) is preferably satisfied:

$$5.60 < h < 12.00 \qquad (7).$$

As described above, conditional expression (7) defines the size of the object (image display panel) to be observed. With satisfying conditional expression (7), observation can be carried out with a proper magnification.

When the value h is equal to or falls below the lower limit of conditional expression (7), the object height becomes too small, so that it becomes difficult to maintain object-space telecentricity with securing observation magnification. Accordingly, it is undesirable. On the other hand, when the value h is equal to or exceeds the upper limit of conditional expression (7), in order to correct various aberrations with securing observation magnification, the optical system become large, so that it is undesirable.

A method for manufacturing an observation optical system according to the present application is a method for manufacturing an observation optical system including, in order from an object side, a first lens having positive refractive power, a second lens having negative refractive power, and a third lens having positive refractive power, the method comprising steps of:

disposing the second lens having a concave surface facing the object side;

disposing the third lens having a convex surface facing an eyepoint side;

disposing at least one aspherical surface on lens surfaces of the first through third lenses; and disposing each lens with satisfying the following conditional expressions (1) and (2):

$$0.80 < (R22+R21)/(R22-R21) < 2.00 \qquad (1)$$

$$1.10 < f1/(-f2) < 2.00 \qquad (2)$$

where R21 denotes a radius of curvature of the object side lens surface of the second lens, R22 denotes a radius of curvature of the eyepoint side lens surface of the second lens, f1 denotes a focal length of the first lens, and f2 denotes a focal length of the second lens.

With this method for manufacturing an observation optical system, it becomes possible to realize a compact observation optical system having excellent optical performance.

An observation optical system according to each numerical example of the present application will be explained below with reference to accompanying drawings.

Example 1

FIG. 1 is a sectional view showing a configuration of an observation optical system according to Example 1 of the present application.

As shown in FIG. 1, the observation optical system according to Example 1 is composed of, in order from a display plane O side of an image display panel, a first lens G1 having positive refractive power, a second lens G2 having negative refractive power and a concave surface facing the display plane O side, and a third lens G3 having positive refractive power and a convex surface facing an eyepoint EP side.

In Example 1, all of the first lens G1, the second lens G2 and the third lens G3 are plastic lenses. In Example 1, an aspherical surface is used on the display plane O side of the second lens G2 and the eyepoint EP side of the third lens G3.

The first lens G1, the second lens G2 and the third lens G3 are moved in a body along an optical axis, thereby carrying out diopter adjustment. On this occasion, respective distances between the first lens G1 through the third lens G3 do not vary.

Various values associated with the observation optical system according to Example 1 are listed in the following Table 1.

In (Lens Surface Data) in Table 1, "O" denotes an image display plane, a surface number "i" represents an order of the lens surface from the display plane O side along the direction in which the light beams travel, "r" denotes a radius of curvature of each optical surface, "d" indicates a distance along an optical axis, and a refractive index "nd" and an Abbe number "vd" represent values with respect to d-line (wavelength λ=587.6 nm). Incidentally, the radius of curvature "r=∞" indicates a plane surface, and the refractive index "nd=1.00000" of the air is omitted. When a lens surface is an aspherical surface, "*" is attached to the left side of the surface number and a paraxial radius of curvature is shown in the second column "r".

An aspherical surface is expressed by the following expression where x is a direction of the optical axis, y is a height in the direction vertical to the optical axis, the vertex of the aspherical surface is to be an origin of the coordinates, r is a radius of curvature (paraxial radius of curvature) of a reference sphere, k is a conical coefficient and A4, A6, A8 and A10 are aspherical surface coefficients:

$$x(y)=(y^2/r)/[1+(1-k\times y^2/r^2)^{1/2}]+A4\times y^4+A6\times y^6+A8\times y^8+A10\times y^{10}.$$

In (Specifications), f1 denotes a focal length of the first lens G1, f2 denotes a focal length of the second lens G2, f3 denotes a focal length of the third lens G3, h denotes an object height, and TL denotes a total length of the optical system. Here, the total length of the optical system TL is a distance along the optical axis between the image display plane O and the most eyepoint EP side lens surface. Incidentally, when a plane parallel plate is inserted in the optical system, TL denotes an air converted total length.

In respective tables for various values shown in Table 1, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols shown in Table 1 is the same in the other Examples.

TABLE 1

(Lens Surface Data)

| i | r | d | nd | vd |
|---|---|---|----|-----|
| O | ∞ | 12.2 | | |
| 1 | 40.2000 | 4.0 | 1.52444 | 56.21 |
| 2 | −12.0830 | 2.5 | | |
| *3 | −6.3017 | 2.0 | 1.58276 | 30.33 |
| 4 | −79.5000 | 2.3 | | |
| 5 | 44.4703 | 5.0 | 1.52444 | 56.21 |
| *6 | −10.6223 | 16.5 | | |

(Aspherical Surface Data)

Surface Number: 3

κ = 0.37241
A4 = −6.2397E−05
A6 = 6.4550E−07
A8 = 2.6617E−08

Surface Number: 6

κ = 0.0765
A4 = 1.0462E−05
A6 = 2.9625E−07
A8 = −8.3646E−10

TABLE 1-continued (Specifications)

f1 = 18.194
f2 = −11.86
f3 = 16.876
h = 6.3
TL = 27.99

(Values for Conditional Expressions)

f1 = 18.194
f2 = −11.86
f3 = 16.876
R21 = −6.3017
R22 = −79.5000
R31 = 44.4703
R32 = −10.6223
d12 = 2.5
TL = 27.99
h = 6.3
(1) (R22 + R21)/(R22 − R21) = 1.172
(2) f1/(−f2) = 1.534
(3) (−1) × {(R32 + R31)/(R32 − R31)} = 0.614
(4) d12/TL = 0.089
(5) f1/f3 = 1.078
(6) h/TL = 0.225
(7) h = 6.3

Figure 2:
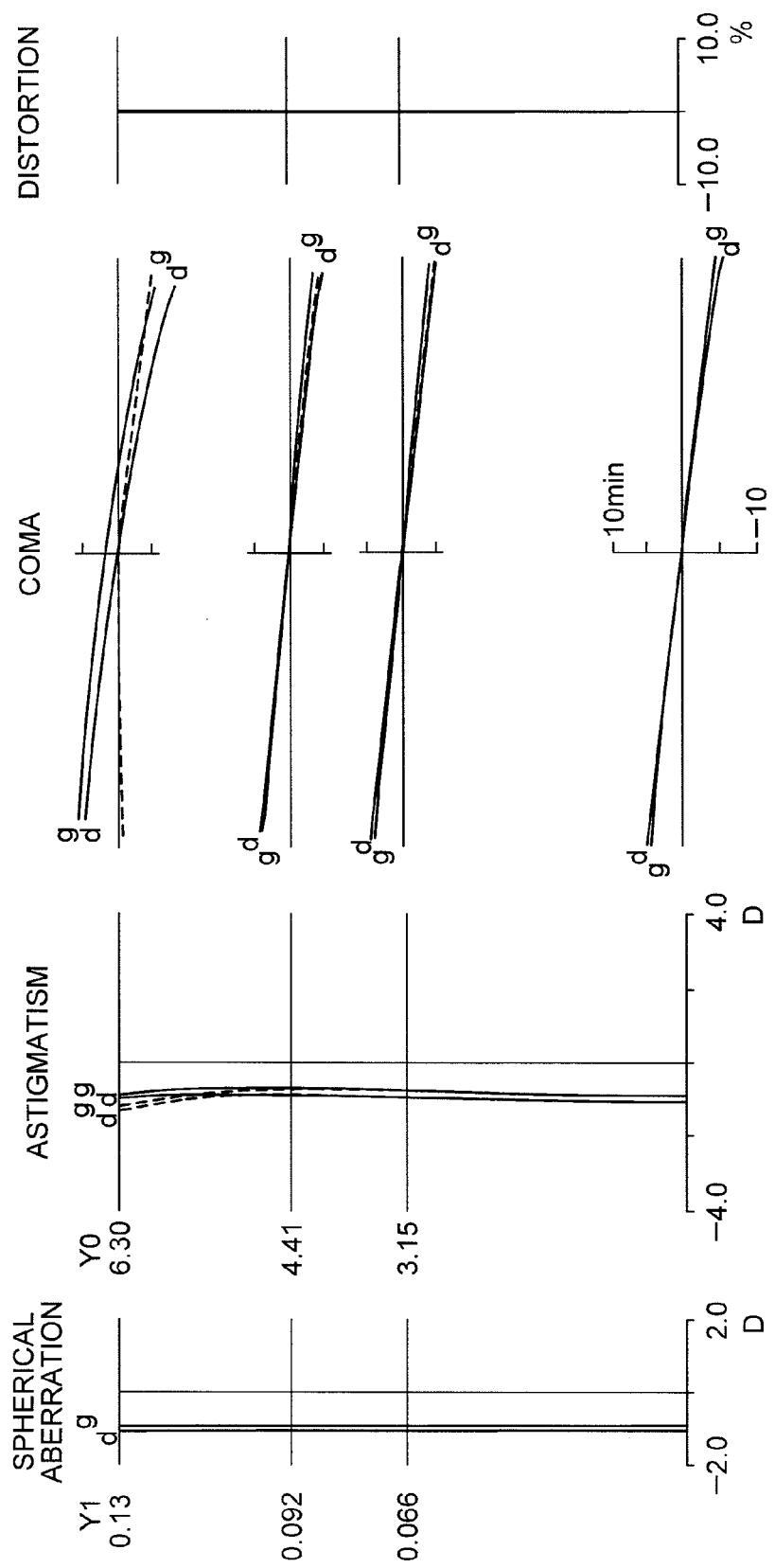
FIG. 2 shows various aberrations of the observation optical system according to Example 1 upon adjusting diopter to −1 ($m^{-1}$).

FIG. 2 shows various aberrations of the observation optical system according to Example 1 upon adjusting diopter to −1 ($m^{-1}$).

Here, "$m^{-1}$" is a unit of diopter, and diopter X ($m^{-2}$) means that an image formed by the eyepiece is located on the optical axis at a position of −1/X (m) from the eyepoint EP. The sign is to be positive when the image is formed to the observer side of the eyepoint EP, and negative when the image is formed to the display plane O side of the eyepoint EP.

In respective graphs, spherical aberration, astigmatism, coma and curvature of field are shown. Y1 denotes a height of ray incident on the optical system, and Y0 denotes a height of the display panel. In graphs showing spherical aberration and astigmatism, unit of horizontal axis is ($m^{-1}$) and shown by "D". In graphs showing coma, "min" is a unit of angle that is a minute of arc and is 1/60 degree. In respective graphs, d indicates an aberration curve with respect to d-line ($\lambda$=587.6 nm) and g indicates an aberration curve with respect to the g-line ($\lambda$=435.8 nm). Note that the descriptions of these graphs are the same with the subsequent Examples.

As is apparent from the respective graphs shown in FIG. 2 the observation optical system according to Example 1 shows superb optical performance as a result of good corrections to various aberrations, in particular, to coma and distortion.

Example 2

Figure 3:
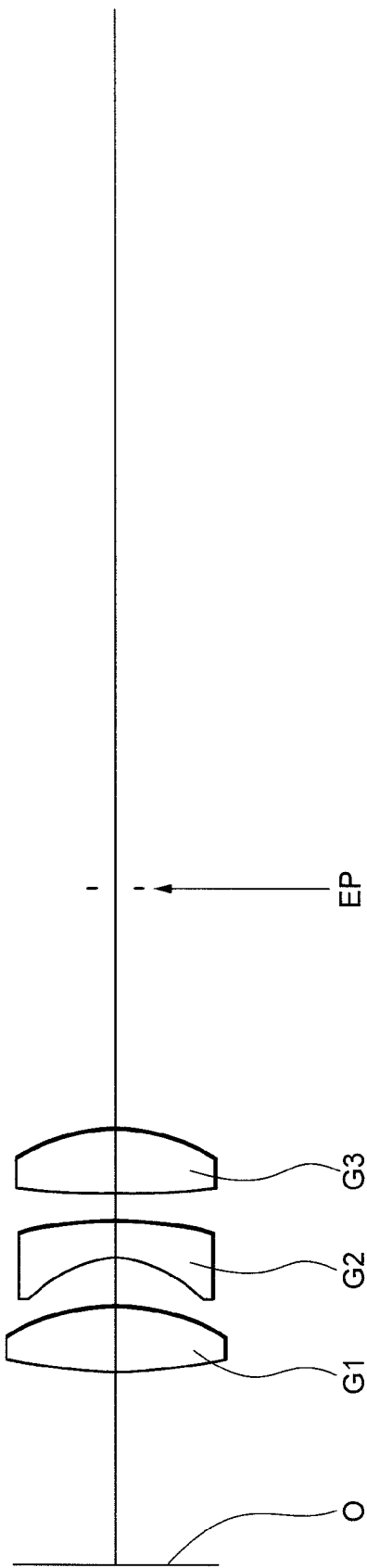
FIG. 3 is a sectional view showing a configuration of an observation optical system according to Example 2 of the present application.

FIG. 3 is a sectional view showing a configuration of an observation optical system according to Example 2 of the present application.

As shown in FIG. 3, the observation optical system according to Example 2 of the present application is similar lens configuration as the one according to Example 1. Moreover, in the observation optical system according to Example 2, an aspherical surface is used on the display plane O side of the second lens G2 and the eyepoint EP side of the third lens G3.

Various values associated with the observation optical system according to Example 2 are listed in the following Table 2.

TABLE 2

(Lens Surface Data)

| i | r | d | nd | vd |
|---|---|---|---|---|
| O | ∞ | 15.0 | | |
| 1 | 42.2697 | 5.1 | 1.53110 | 55.80 |
| 2 | −16.6641 | 3.9 | | |
| *3 | −7.7224 | 2.8 | 1.60740 | 27.03 |
| 4 | −31.6766 | 2.2 | | |
| 5 | 108.2386 | 5.0 | 1.53110 | 55.80 |
| *6 | −13.0500 | 18.4 | | |

(Aspherical Surface Data)

Surface Number: 3

$\kappa$ = 0.28820
A4 = −0.00003
A6 = 1.8126E−07
A8 = 5.4940E−09

Surface Number: 6

$\kappa$ = −0.31553
A4 = −8.5592E−06
A6 = 1.3409E−07
A8 = −2.2059E−10

(Specifications)

f1 = 23.2482
f2 = −17.59
f3 = 29.07
h = 8.2
TL = 34.00

(Values for Conditional Expressions)

f1 = 23.2482
f2 = −17.59
f3 = 29.07
R21 = −7.7224
R22 = −31.6766
R31 = 108.2386
R32 = −13.0500
d12 = 3.9
TL = 34.00
h = 8.2
(1) (R22 + R21)/(R22 − R21) = 1.645
(2) f1/(−f2) = 1.322
(3) (−1) × {(R32 + R31)/(R32 − R31)} = 0.785
(4) d12/TL = 0.115
(5) f1/f3 = 1.043
(6) h/TL = 0.241
(7) h = 8.2

Figure 4:
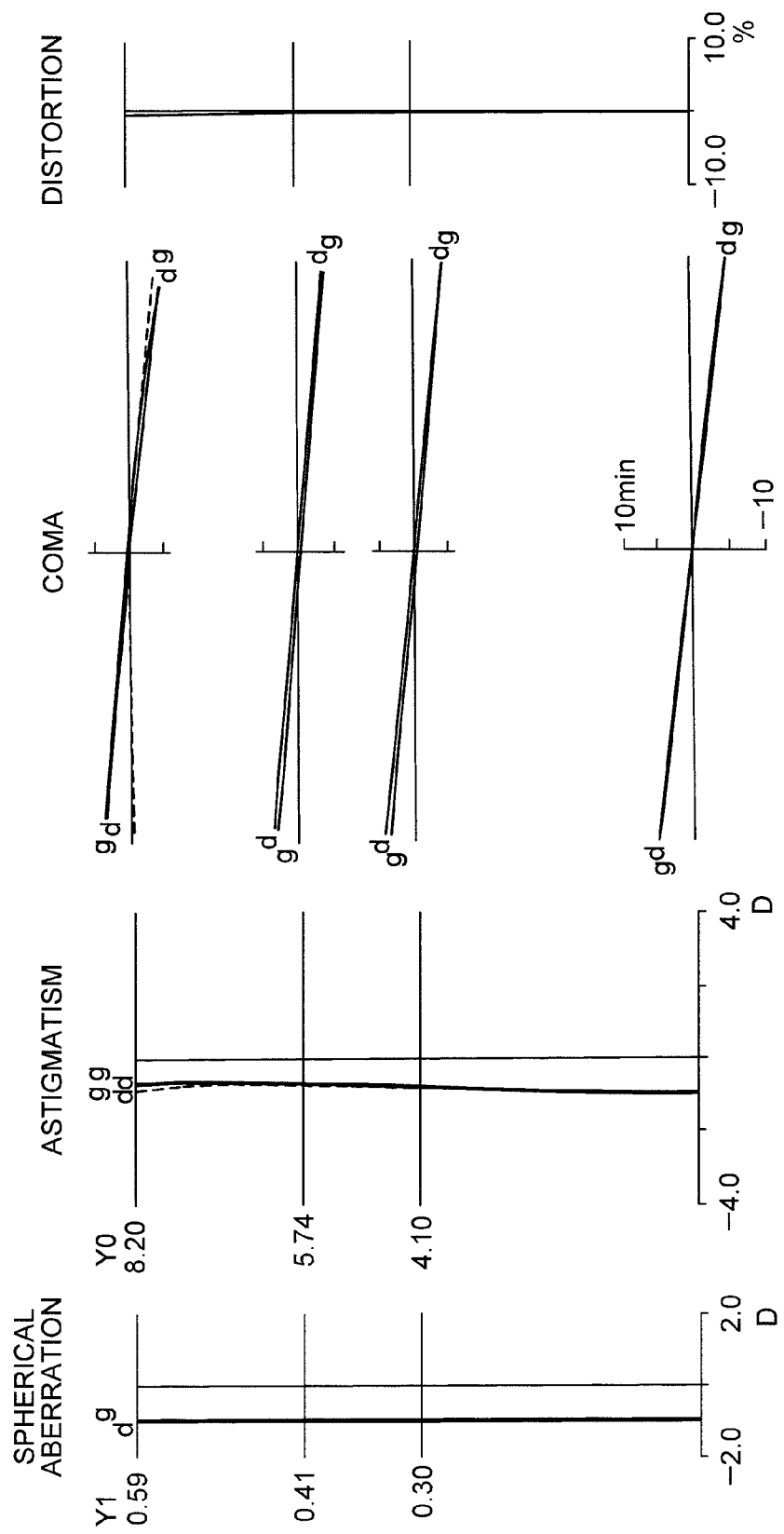
FIG. 4 shows various aberrations of the observation optical system according to Example 2 upon adjusting diopter to −1 (m$^{-1}$).

FIG. 4 shows various aberrations of the observation optical system according to Example 2 upon adjusting diopter to −1 ($m^{-1}$).

As is apparent from the respective graphs shown in FIG. 4 the observation optical system according to Example 2 shows superb optical performance as a result of good corrections to various aberrations, in particular, to coma and distortion.

Example 3

Figure 5:
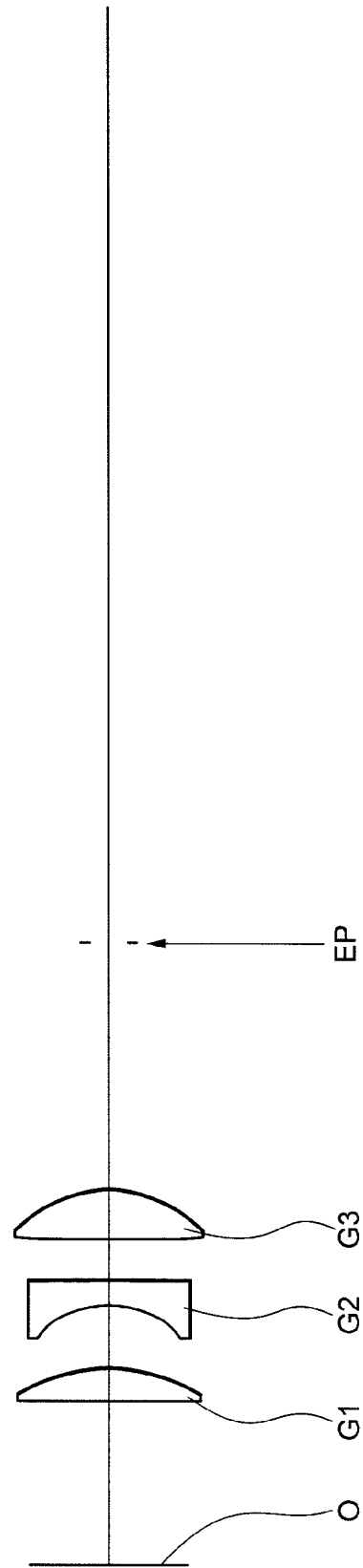
FIG. 5 is a sectional view showing a configuration of an observation optical system according to Example 3 of the present application.

FIG. 5 is a sectional view showing a configuration of an observation optical system according to Example 3 of the present application.

As shown in FIG. 5, the observation optical system according to Example 3 of the present application is similar lens configuration as the one according to Example 1. Moreover, in the observation optical system according to Example 3, an aspherical surface is used on the display plane O side of the second lens G2 and the eyepoint EP side of the third lens G3.

Various values associated with the observation optical system according to Example 3 are listed in the following Table 3.

TABLE 3

(Lens Surface Data)

| i | r | d | nd | vd |
|---|---|---|---|---|
| O | ∞ | 11.6 | | |
| 1 | −549.7055 | 2.6 | 1.52444 | 56.21 |
| 2 | −13.1935 | 4.9 | | |
| *3 | −8.2614 | 2.0 | 1.60737 | 27.03 |
| 4 | −351.8917 | 3.2 | | |
| 5 | 162.5158 | 3.9 | 1.52444 | 56.21 |
| *6 | −9.3659 | 19.0 | | |

(Aspherical Surface Data)

Surface Number: 3

κ = 1.10431
A4 = −0.00013
A6 = −1.2165E−06
A8 = −3.8906E−08

Surface Number: 6

κ = 0.66739
A4 = 9.0632E−06
A6 = −8.8470E−08
A8 = 3.7156E−09

(Specifications)

f1 = 25.7331
f2 = −13.96
f3 = 17.019
h = 6.3
TL = 28.2

(Values for Conditional Expressions)

f1 = 25.7331
f2 = −13.96
f3 = 17.019
R21 = −8.2614
R22 = −351.8917
R31 = 162.5158
R32 = −9.3659
d12 = 4.9
TL = 28.2
h = 6.3
(1) (R22 + R21)/(R22 − R21) = 1.048
(2) f1/(−f2) = 1.843
(3) (−1) × {(R32 + R31)/(R32 − R31)} = 0.891
(4) d12/TL = 0.174
(5) f1/f3 = 1.512
(6) h/TL = 0.223
(7) h = 6.3

Figure 6:
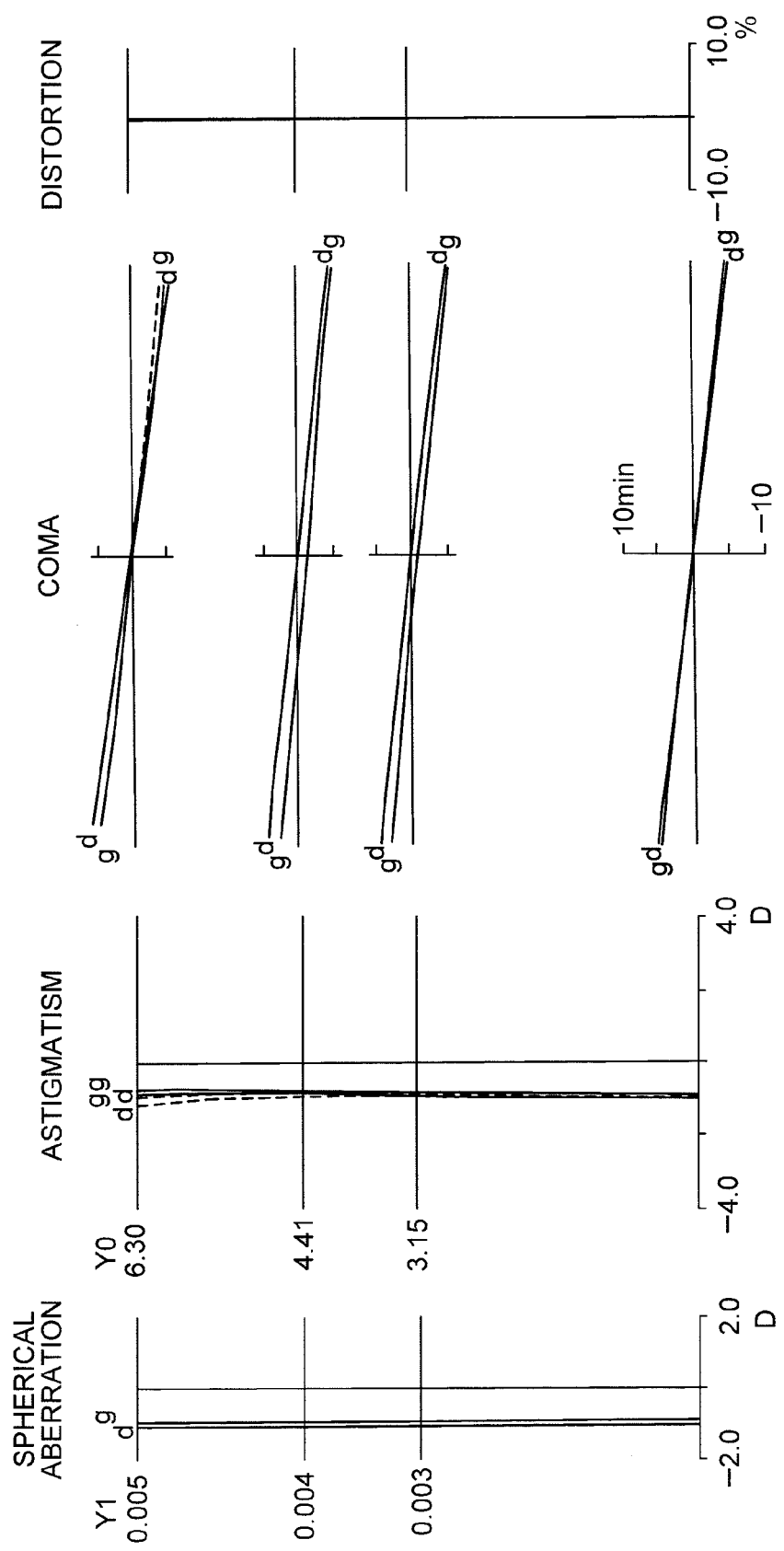
FIG. 6 shows various aberrations of the observation optical system according to Example 3 upon adjusting diopter to −1 (m$^{-1}$).

FIG. 6 shows various aberrations of the observation optical system according to Example 3 upon adjusting diopter to −1 (m$^{-1}$).

As is apparent from the respective graphs shown in FIG. 6 the observation optical system according to Example 3 shows superb optical performance as a result of good corrections to various aberrations, in particular, to coma and distortion.

Example 4

Figure 7:
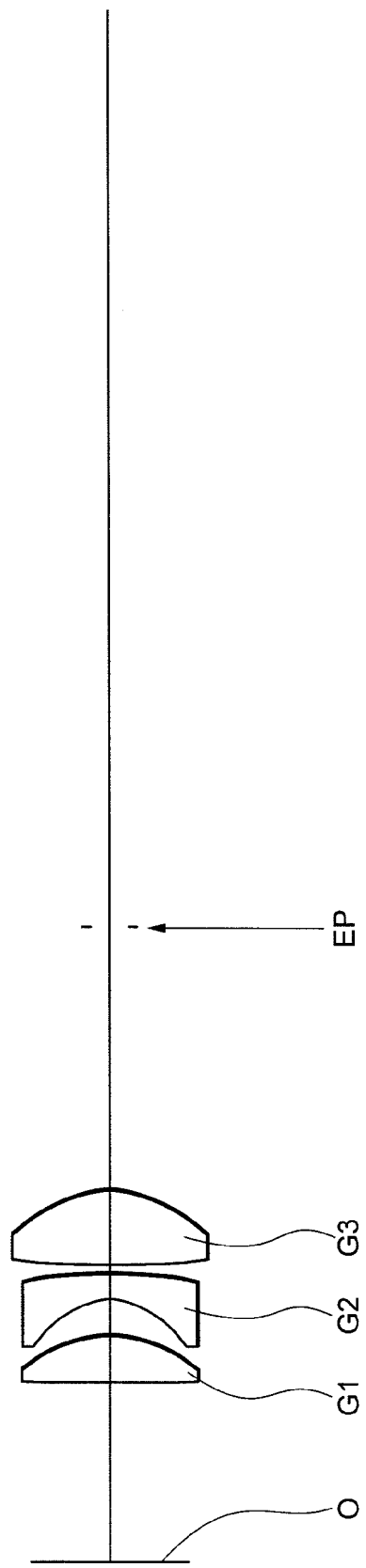
FIG. 7 is a sectional view showing a configuration of an observation optical system according to Example 4 of the present application.

FIG. 7 is a sectional view showing a configuration of an observation optical system according to Example 4 of the present application.

As shown in FIG. 7, the observation optical system according to Example 4 of the present application is similar lens configuration as the one according to Example 1. Moreover, in the observation optical system according to Example 4, an aspherical surface is used on the eyepoint EP side of the first lens G1, the display plane O side of the second lens G2 and the eyepoint EP side of the third lens G3.

Various values associated with the observation optical system according to Example 4 are listed in the following Table 4.

TABLE 4

(Lens Surface Data)

| i | r | d | nd | vd |
|---|---|---|---|---|
| O | ∞ | 12.9 | | |
| 1 | 388.9349 | 3.7 | 1.53110 | 55.91 |
| *2 | −9.8898 | 2.9 | | |
| *3 | −5.7147 | 2.0 | 1.58276 | 30.33 |
| 4 | −40.9279 | 0.7 | | |
| 5 | 74.0852 | 5.8 | 1.53110 | 55.91 |
| *6 | −9.3344 | 20.0 | | |

(Aspherical Surface Data)

Surface Number: 2

κ = 0.72042
A4 = 0.52402E−04
A6 = 0.13508E−05
A8 = −0.10764E−07

Surface Number: 3

κ = 0.24355
A4 = −0.10662E−03
A6 = 0.26311E−05
A8 = −0.12815E−07

Surface Number: 6

κ = 0.13940
A4 = −0.44120E−07
A6 = 0.42345E−06
A8 = −0.12391E−08

(Specifications)

f1 = 18.426
f2 = −11.45
f3 = 16.175
h = 6.3
TL = 28.04

(Values for Conditional Expressions)

f1 = 18.426
f2 = −11.45
f3 = 16.175
R21 = −5.7147
R22 = −40.9279
R31 = 74.0852
R32 = −9.3344
d12 = 2.9
TL = 28.04
h = 6.3
(1) (R22 + R21)/(R22 − R21) = 1.307
(2) f1/(−f2) = 1.609
(3) (−1) × {(R32 + R31)/(R32 − R31)} = 0.776
(4) d12/TL = 0.103
(5) f1/f3 = 1.139
(6) h/TL = 0.225
(7) h = 6.3

Figure 8:
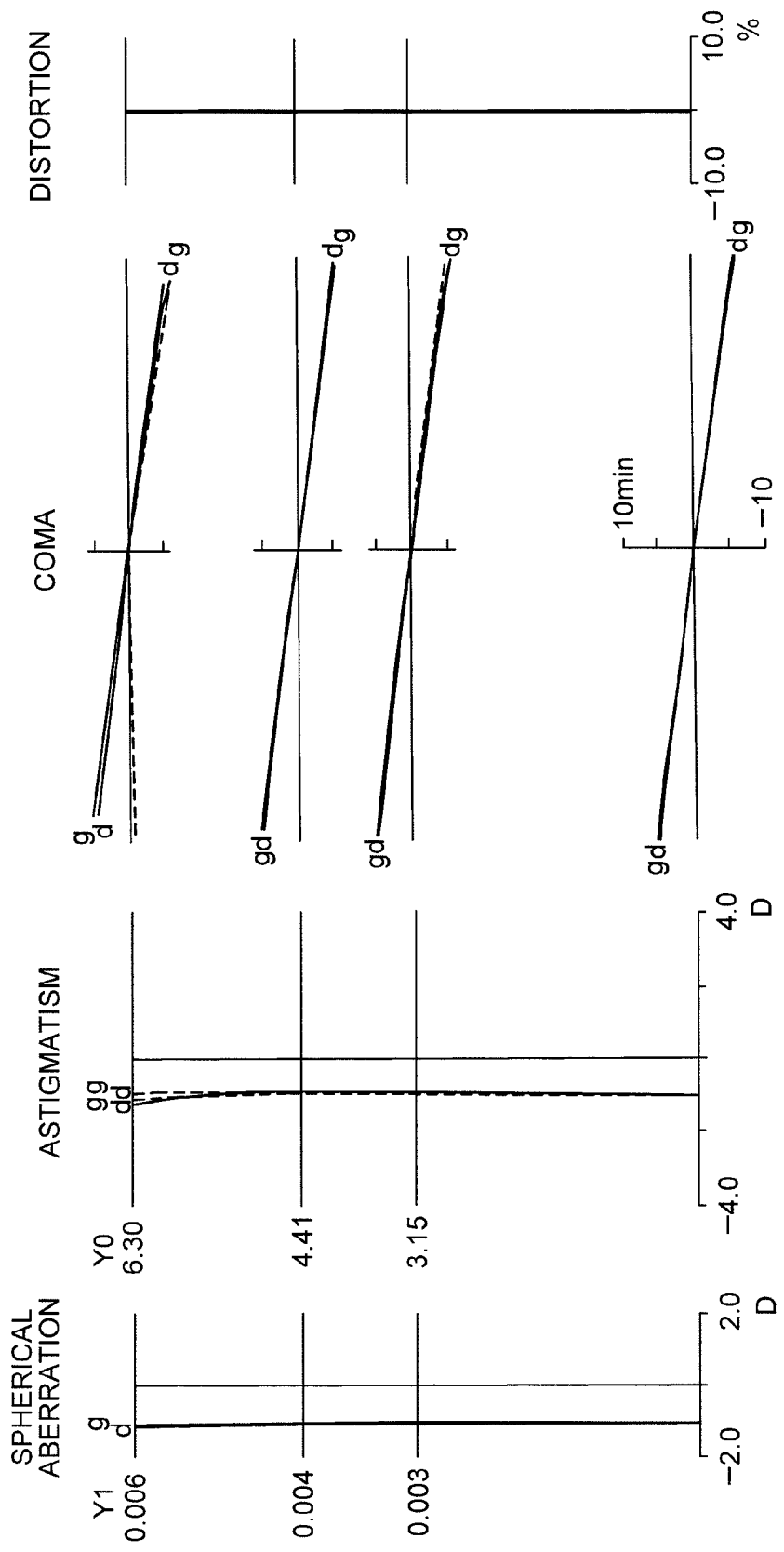
FIG. 8 shows various aberrations of the observation optical system according to Example 4 upon adjusting diopter to −1 (m$^{-1}$).

FIG. 8 shows various aberrations of the observation optical system according to Example 4 upon adjusting diopter to −1 (m$^{-1}$).

As is apparent from the respective graphs shown in FIG. 8 the observation optical system according to Example 4 shows superb optical performance as a result of good corrections to various aberrations, in particular, to coma and distortion.

Example 5

Figure 9:
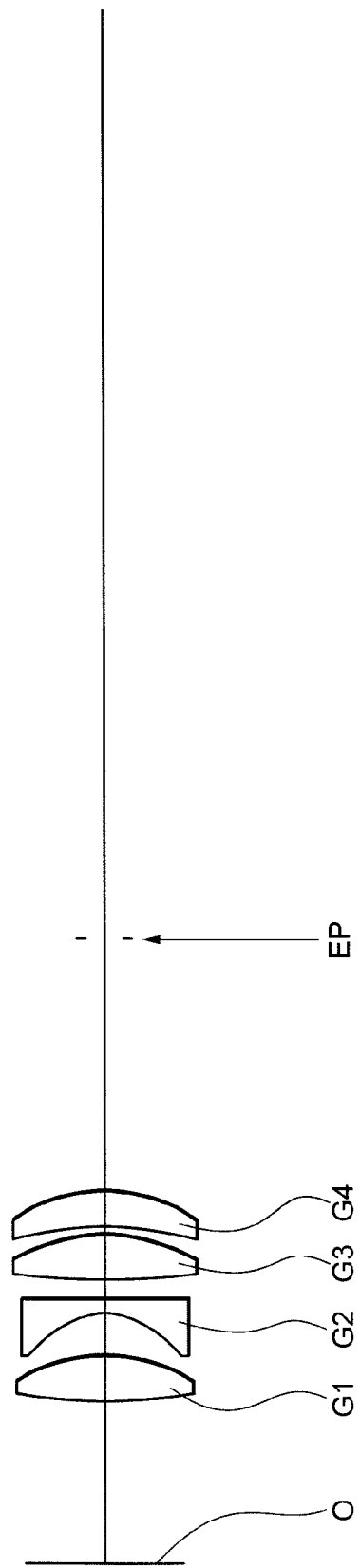
FIG. 9 is a sectional view showing a configuration of an observation optical system according to Example 5 of the present application.

FIG. 9 is a sectional view showing a configuration of an observation optical system according to Example 5 of the present application.

As shown in FIG. 9, the observation optical system according to Example 5 of the present application is composed of, in order from a display plane O side of an image display panel, a first lens G1 having positive refractive power, a second lens G2 having negative refractive power and a concave surface facing the display plane O side, a third lens G3 having positive refractive power and a convex surface facing an eyepoint EP side, and a fourth lens G4 having positive refractive power and a concave surface facing the display plane O side. In this manner, the lens configuration according to Example 5 is a four-lens-group configuration.

In the observation optical system according to Example 5, as the same as the above Examples, all of the lenses are plastic lenses. Moreover, in the observation optical system according to Example 5, an aspherical surface is used on the display plane O side of the second lens G2, the eyepoint EP side of the third lens G3 and the eyepoint EP side of the fourth lens G4.

Various values associated with the observation optical system according to Example 5 are listed in the following Table 5.

TABLE 5

(Lens Surface Data)

| i | r | d | nd | vd |
|---|---|---|---|---|
| O | ∞ | 11.5 | | |
| 1 | 49.0892 | 3.6 | 1.53110 | 55.91 |
| 2 | −13.2827 | 3.4 | | |
| *3 | −6.1837 | 1.1 | 1.58276 | 30.33 |
| 4 | −319.4041 | 1.5 | | |
| 5 | 61.1530 | 3.6 | 1.53110 | 55.91 |
| *6 | −12.6578 | 0.6 | | |
| 7 | −27.0537 | 2.8 | 1.53110 | 55.91 |
| *8 | −12.6623 | 19.5 | | |

(Aspherical Surface Data)

Surface Number: 3

κ = −0.01163
A4 = −0.24916E−03
A6 = 0.76100E−06
A8 = 0.13807E−07

Surface Number: 6

κ = 0.11130
A4 = 0.29151E−04
A6 = 0.12134E−05
A8 = −0.22326E−08

Surface Number: 8

κ = 1.28631
A4 = 0.51446E−04
A6 = −0.43976E−06
A8 = 0.58471E−08

TABLE 5-continued (Specifications)

f1 = 20.086
f2 = −10.84
f3 = 20.086
h = 6.3
TL = 28.14

(Values for Conditional Expressions)

f1 = 20.086
f2 = −10.84
f3 = 20.086
R21 = −6.1837
R22 = −319.4041
R31 = 61.1530
R32 = −12.6578
d12 = 3.4
TL = 28.14
h = 6.3
(1) (R22 + R21)/(R22 − R21) = 1.039
(2) f1/(−f2) = 1.854
(3) (−1) × {(R32 + R31)/(R32 − R31)} = 0.657
(4) d12/TL = 0.121
(5) f1/f3 = 1.000
(6) h/TL = 0.224
(7) h = 6.3

Figure 10:
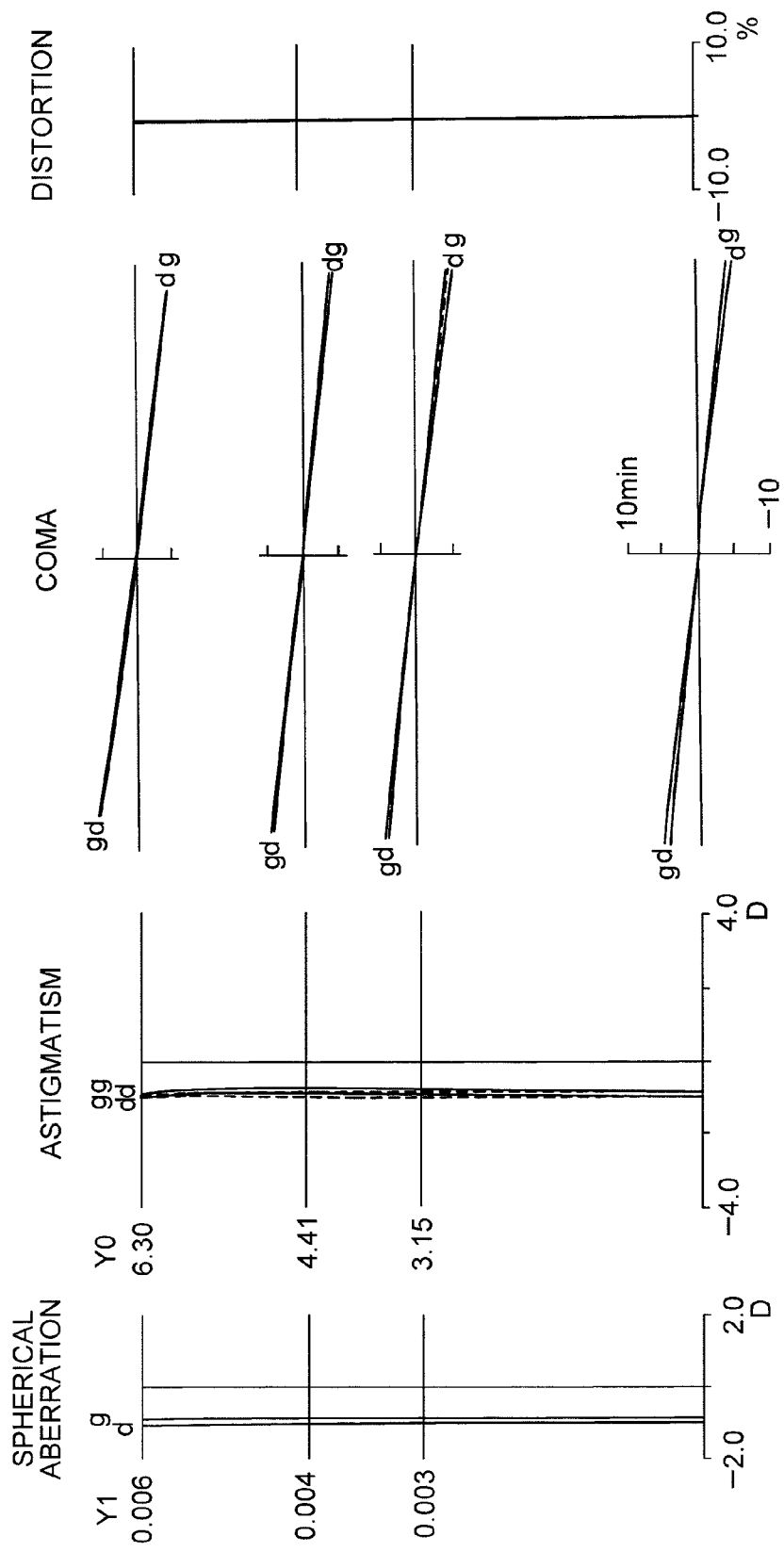
FIG. 10 shows various aberrations of the observation optical system according to Example 5 upon adjusting diopter to −1 (m$^{-1}$).

FIG. 10 shows various aberrations of the observation optical system according to Example 5 upon adjusting diopter to −1 ($m^{-1}$).

As is apparent from the respective graphs shown in FIG. 10 the observation optical system according to Example 5 shows superb optical performance as a result of good corrections to various aberrations, in particular, to coma and distortion.

Then, a viewfinder equipped with an observation optical system according to the present application is explained.

Figure 11:
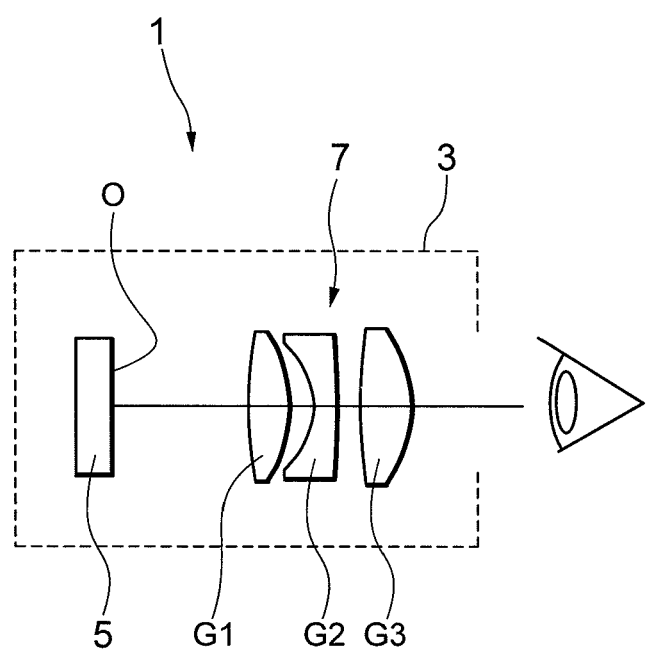
FIG. 11 is a sectional view showing a configuration of a viewfinder equipped with the observation optical system according to the present application.

FIG. 11 is a sectional view showing a configuration of a viewfinder equipped with the observation optical system according to the present application. As shown in FIG. 11, the viewfinder 1 is equipped with an image display 5 for displaying an image, and an observation optical system 7 for observing the image displayed on the image display 5, which are installed in a finder case 3 having a light blocking function. An observer can observe the image displayed on the image display 5 through the observation optical system 7.

The image display 5 may be constructed by a display panel composed of an image display device such as a liquid crystal display (LCD), and a back light integrally constructed on the rear side of the display panel.

Diopter adjustment of the viewfinder 1 is carried out by moving the whole of the observation optical system 7 integrally along the optical axis. In other words, a distance between a display surface O of the image display 5 and the image display 5 side surface of the first lens G1 disposed to the most image display 5 side of the observation optical system 7 is varied, thereby carrying out diopter adjustment. On this occasion, distances between the first lens G1, the second lens G2 and the third lens G3 are not varied. In this manner, with moving the observation optical system 7 integrally, the viewfinder 1 makes it possible to carry out diopter adjustment.

Moreover, the observation optical system 7 may be applied to a viewfinder composed of a focusing screen substituting the image display panel of the image display 5 shown in FIG. 11. In the case of the viewfinder substituting the image display panel with a focusing screen, an optical system (not shown) for forming an image on the focusing screen is to dispose additionally.

Then, a method for manufacturing an observation optical system is explained below.

FIG. 12 is a flowchart showing an outline of a method for manufacturing an observation optical system according to the present application.

A method for manufacturing an observation optical system according to the present application is a method for manufacturing an observation optical system including a first lens G1 having positive refractive power, a second lens G2 having negative refractive power, and a third lens G3 having positive refractive power, the method includes the following steps S1 through S4.

Step S1: disposing a concave surface on the display surface O side of the second lens G2.

Step S2: disposing a convex surface on the eyepoint EP side of the third lens G3.

Step S3: disposing an aspherical surface on at least one surface of the first lens G1, the second lens G2 and the third lens G3.

Step S4: disposing each lens into a viewfinder case with satisfying the following conditional expressions (1) and (2):

$$0.80<(R22+R21)/(R22-R21)<2.00 \quad (1)$$

$$1.10<f1/(-f2)<2.00 \quad (2)$$

where R21 denotes a radius of curvature of the object side lens surface of the second lens, R22 denotes a radius of curvature of the eyepoint side lens surface of the second lens, f1 denotes a focal length of the first lens, and f2 denotes a focal length of the second lens.

With the method for manufacturing an observation optical system according to the present application, it becomes possible to manufacture a compact observation optical system having excellent optical performance.

What is claimed is:
1. An optical system,
the optical system being configured as an observation optical system for observing an object and comprising, in order from the object side:
a first lens having positive refractive power;
a second lens having negative refractive power and a concave surface facing the object side; and
a third lens having positive refractive power and a convex surface on an optical axis and facing an eyepoint side,
an aspherical surface being included on at least one lens surface, and
the following conditional expressions being satisfied:

$$0.80<(R22+R21)/(R22-R21)<2.00$$

$$1.534 \leq f1/(-f2)<2.00$$

where R21 denotes a radius of curvature of the object side lens surface of the second lens, R22 denotes a radius of curvature of the eyepoint side lens surface of the second lens, f1 denotes a focal length of the first lens, and f2 denotes a focal length of the second lens.
2. The optical system according to claim 1, wherein the following conditional expression is satisfied:

$$0.50<(-1)\times((R32+R31)/(R32-R31))<1.00$$

where R31 denotes a radius of curvature of the object side lens surface of the third lens, and R32 denotes a radius of curvature of the eyepoint side lens surface of the third lens.

3. The optical system according to claim 1, wherein the following conditional expression is satisfied:

$$0.05<d12/TL<0.30$$

where d12 denotes a distance between the eyepoint side lens surface of the first lens and the object side lens surface of the second lens, and TL denotes a distance between the object plane and the most eyepoint side lens surface.
4. The optical system according to claim 1, wherein the following conditional expression is satisfied:

$$0.90<f1/f3<2.30$$

where f1 denotes a focal length of the first lens and f3 denotes a focal length of the third lens.
5. The optical system according to claim 1, wherein all of the first lens, the second lens and the third lens are constructed by plastic lenses.
6. The optical system according to claim 1, wherein an aspherical surface is disposed on the object side surface of the second lens.
7. The optical system according to claim 1, wherein an aspherical surface is disposed on the eyepoint side surface of the third lens.
8. The optical system according to claim 1, wherein the following conditional expression is satisfied:

$$0.20<h/TL<0.35$$

where h denotes an object height, and TL denotes a distance between the object plane and the most eyepoint side lens surface.
9. The optical system according to claim 1, wherein the following conditional expression is satisfied:

$$5.60<h<12.00$$

where h denotes an object height.
10. A viewfinder equipped with an image display panel, and the optical system according to claim 1.
11. The viewfinder according to claim 10, wherein diopter adjustment is carried out by varying a distance between the image display panel and the object side lens surface of the first lens.
12. The viewfinder according to claim 11, wherein distances between the first lens through the third lens are not varied upon adjusting diopter.
13. An optical apparatus equipped with the optical system according to claim 1.
14. A viewfinder comprising:
an image display panel; and
an observation optical system configured for observing an image displayed on the image display panel,
the observation optical system comprising, in order from the image display panel side, a first lens having positive refractive power, a second lens having negative refractive power and a concave surface facing the image display panel side, and a third lens having positive refractive power and a convex surface on an optical axis and facing an eyepoint side,
an aspherical surface being formed on either one of the first lens and the third lens, and
the following conditional expression being satisfied:

$$0.20<h/TL<0.26$$

where h denotes an object height, and TL denotes a distance between the object plane and the most eyepoint side lens surface.

15. The viewfinder according to claim 14, wherein the following conditional expression is satisfied:

$$5.60 < h < 12.00$$

where h denotes an object height.

16. An optical apparatus equipped with the viewfinder according to claim 14.

17. A method for manufacturing an optical system including a first lens having positive refractive power, a second lens having negative refractive power, and a third lens having positive refractive power, the method configuring the optical system as an observation optical system for observing an object and comprising steps of:
  disposing a concave surface on the object side lens surface of the second lens;
  disposing a convex surface on an optical axis on an eyepoint side lens surface of the third lens;
  disposing an aspherical surface on at least one of the first lens through the third lens; and
  disposing each lens with satisfying the following conditional expressions:

$$0.80 < (R22+R21)/(R22-R21) < 2.00$$

$$1.534 \leq f1/(-f2) < 2.00$$

where R21 denotes a radius of curvature of the object side lens surface of the second lens, R22 denotes a radius of curvature of the eyepoint side lens surface of the second lens, f1 denotes a focal length of the first lens, and f2 denotes a focal length of the second lens.

18. The method according to claim 17, further comprising a step of:
  disposing the third lens with satisfying the following conditional expression:

$$0.50 < (-1) \times ((R32+R31)/(R32-R31)) < 1.00$$

where R31 denotes a radius of curvature of the object side lens surface of the third lens, and R32 denotes a radius of curvature of the eyepoint side lens surface of the third lens.

19. The method according to claim 17, further comprising a step of:
  disposing each lens with satisfying the following conditional expression:

$$0.05 < d12/TL < 0.30$$

where d12 denotes a distance between the eyepoint side lens surface of the first lens and the object side lens surface of the second lens, and TL denotes a distance between the object plane and the most eyepoint side lens surface.

20. The method according to claim 17, further comprising a step of:
  disposing each lens with satisfying the following conditional expression:

$$0.90 < f1/f3 < 2.30$$

where f1 denotes a focal length of the first lens and f3 denotes a focal length of the third lens.

21. A method for manufacturing a viewfinder including an image display panel and an optical system, the method configuring the optical system as an observation optical system for observing an image displayed on the image display panel and comprising steps of:
  disposing, in order from the image display panel side, a first lens having positive refractive power, a second lens having negative refractive power and a concave surface facing the image display panel side, and a third lens having positive refractive power and a convex surface on an optical axis and facing an eyepoint side, into the optical system;
  disposing an aspherical surface on either one of the first lens and the third lens; and
  disposing each lens with satisfying the following conditional expression:

$$0.20 < h/TL < 0.26$$

where h denotes an object height, and TL denotes a distance between the object plane and the most eyepoint side lens surface.

22. The method according to claim 21, further comprising a step of:
  disposing each lens with satisfying the following conditional expression:

$$5.60 < h < 12.00$$

where h denotes an object height.

23. A viewfinder comprising:
  an image display panel; and
  an observation optical system configured for observing an image displayed on the image display panel,
  the observation optical system comprising, in order from the image display panel side, a first lens having positive refractive power, a second lens having negative refractive power and a concave surface facing the image display panel side, and a third lens having positive refractive power and a convex surface on an optical axis and facing an eyepoint side,
  an aspherical surface being formed on either one of the first lens and the third lens, and
  the following conditional expressions being satisfied:

$$0.20 < h/TL < 0.35$$

$$5.60 < h < 12.00$$

where h denotes an object height, and TL denotes a distance between the object plane and the most eyepoint side lens surface.

24. A method for manufacturing a viewfinder including an image display panel and an optical system, the method configuring the optical system as an observation optical system for observing image displayed on the image display panel and comprising steps of:
  disposing, in order from the image display panel side, a first lens having positive refractive power, a second lens having negative refractive power and a concave surface facing the image display panel side, and a third lens having positive refractive power and a convex surface on an optical axis and facing an eyepoint side, into the observation optical system;
  disposing an aspherical surface on either one of the first lens and the third lens; and
  disposing each lens with satisfying the following conditional expressions:

$$0.20 < h/TL < 0.35$$

$$5.60 < h < 12.00$$

where h denotes an object height, and TL denotes a distance between the object plane and the most eyepoint side lens surface.

* * * * *